May 8, 1951 R. C. HAFF 2,551,944
METHOD OF RECOVERING ALUMINA FROM ALUMINA BEARING ORES
Filed April 19, 1947
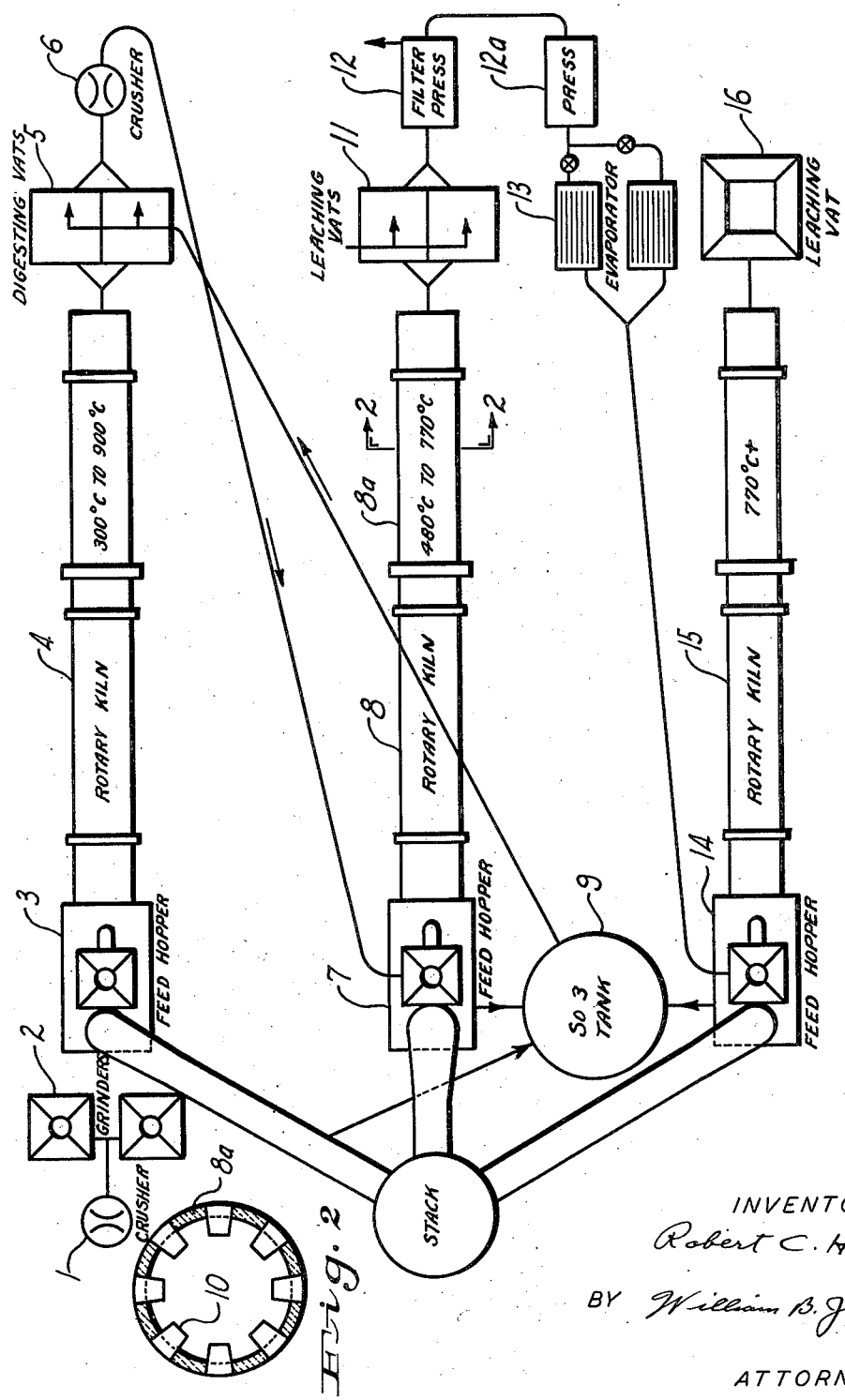
INVENTOR
Robert C. Haff
BY William B. Jaspert
ATTORNEY Patented May 8, 1951

2,551,944

UNITED STATES PATENT OFFICE 2,551,944

METHOD OF RECOVERING ALUMINA FROM ALUMINA-BEARING ORES

Robert C. Haff, Latrobe, Pa.

Application April 19, 1947, Serial No. 742,676

2 Claims. (Cl. 23—141)

This invention relates to method of and apparatus for treating alumina bearing ores and the like, and it is among the objects thereof to provide a method of treating alumina bearing ores to separate the valuable products in their commercially pure state.

The invention is especially adapted for treating clay ores, feldspar, diaspore, cyanite, bauxites, the red mud wastes of the Bayer Process for bauxite, alums, alunite, bentonite, shales and other alumina bearing ores; also the process may be employed for the recovery of alumina oxide and vanadium oxide and the like from slags such as iron, vanadium and chromium slags.

The present invention is a modification of and in some respects an improvement on the method of treating aluminum compounds disclosed in my Patent No. 2,398,425, granted April 16, 1946.

The invention will become more apparent from a consideration of the accompanying drawing, constituting a part hereof, in which like reference characters designate like parts, and in which Fig. 1 is a view diagrammatically illustrating apparatus carrying out my improved method of treating alumina ores; and Fig. 2 a cross sectional view taken along the line 2—2, Fig. 1.

Clay or other alumina bearing bodies are crushed in a crusher 1 and then ground in grinders 2 and fed by a feed hopper 3 to a rotary calcining kiln 4 wherein it is heated at a temperature between 300° C. to 900° C. to prepare the ore for digestion in vats 5 by adding from 30% to concentrated solution of sulphuric acid ($H_2SO_4$), or other suitable acids, to change the insoluble aluminum oxide ($Al_2O_3$) to soluble aluminum sulphate ($Al_2(SO_4)_3$). By this step any iron or titanium oxides present are changed to soluble sulphates. The digested product is then passed as a solid to a crusher 6 and thence to the feed hopper 7 of another kiln or it is passed as a slurry to the second kiln, generally designated by the numeral 8. The latter kiln can be fired from either end. The fuel used for burning can be added with the material at the hopper 7 or at the discharge end of kiln 8. When alunite or any alumina bearing ores containing $SO_3$ are heated in kiln 4 they are caught in the stack chamber and put into tank 9. Should any potassium or sodium compounds be present between discharge end of tank 4 and the digestion vat they are leached out before digestion.

In the digesting step after calcining in the kiln 4, the $H_2O$ added is preferably of 66° Bé. which contains approximately 93.19% $H_2SO_4$ or 76.07% $SO_3$ at a specific gravity of 1.8354 at 60° F. At a temperature of 70° F., which is room temperature, the Bé. of $H_2SO_4$ is 65.75° with approximately 92.10% $H_2SO_4$ or 75.19% $SO_3$ and a specific gravity of 1.8300. As each part of the $Al_2O_3$ requires 2.355 parts of $SO_3$ to form $Al_2(SO_4)_3$, each part of $Al_2O_3$ requires 3.10 parts of $H_2SO_4$ at 1.8300 specific gravity at 70° F. In liquid measure this would be 1.7 parts $H_2SO_4$ at a temperature of 70° F. for each part of $Al_2O_3$ by weight. I do not wish to be limited to the use of concentrated $H_2SO_4$ at 66° Bé., as I have used weaker $H_2SO_4$ with a Bé. of 27° and specific gravity of 1.229 at 60° F. If a weaker acid is used, the amount should be so that there is sufficient $SO_3$ in the proportion of 2.355 parts $SO_3$ to one part of $Al_2O_3$, and also sufficient $SO_3$ to change the iron and titanium to sulphates. Also when weaker acids are used the time of the digestion is prolonged on account of the evaporation of the excess water present.

Should an excess $H_2SO_4$ be present after digestion of the $Al_2O_3$ in the calcine, I may add more calcine material so that all the $SO_3$ present in the excess acid combines with the $Al_2O_3$ in the added calcine and forms $Al_2(SO_4)_3$. The calcine may be added to either hot or cold acid solutions and the acid may be added to hot or cold calcine.

A slight amount of heat is used to start the digestion which causes a somewhat violent reaction as the $Al_2O_3$ and $SO_3$ combine to form $Al_2(SO_4)_3$. During the reaction the temperature stays below 300° C. The more concentrated the acid used the more violent the reaction and the higher the temperature, which, however, is always below 300° C. At a 30% strength of $H_2SO_4$, the temperature during the reaction is about 150° C. By the use of concentrated $H_2SO_4$, the reaction may take place 15 to 20 minutes, but when a 30% solution is used the reaction may take one hour or longer. The heating of the mass is continued until it becomes a solid mass and white fumes, $SO_3$, are driven off. These fumes appear when excess $H_2SO_4$ is used.

The result of the digestion of the calcined material treated in the kiln 1 is that if the calcine contains either iron or titanium oxide they would be converted to $Fe_2(SO_4)_3$ and $Ti_2(SO_4)_3$. The aluminum and iron sulphate are dissolved by the addition of sufficient water and heated and the $Ti_2(SO_4)_3$ will also be dissolved if a slight amount of $H_2SO_4$ is present, which there usually is. If small amounts of potassium or sodium compounds are present in the calcine in some form, such as in combination with alumina and silica, they would form an insoluble potassium or sodium alumina silicate which has the same composition as Feldspars, and if present as $K_2SO_4$ or $Na_2SO_4$, it is soluble by the addition of sufficient water and heated.

After the slurry or the crushed mass is delivered to the feed hopper 7 of the second kiln 8, it is heated to a temperature of from 480° C. to 770° C. to drive off excess $H_2SO_4$ which is accumulated in storage tank 9 from which it is delivered to the vat 5 for the digestive process hereinabove described. The $SO_3$ is also driven off and the iron sulphate is changed to insoluble iron oxide. The kiln for heating at these temperatures is preferably lined with glazed fire brick and the section of the kiln designated by the numeral 8a is preferably provided with baffles 10 as shown in Fig. 2, which function to agitate the material to expose it to the flame from the burning end of the kiln to assure complete change of soluble $Fe_2(SO_4)_3$ to insoluble $Fe_2O_3$. The material is fed into the vats 11 and sufficient water is added to the finely ground mass and heated to make all the $Al_2(SO_4)_3$ soluble. Any $K_2SO_4$ or $Na_2SO_4$ present also becomes soluble. The insoluble residue containing $SiO_2$, $Fe_2O_3$, $Ti_2(SO_4)_3$ and $K_2O Al_2O_3 6SiO_2$ or $Na_2O Al_2O_3 6SiO_2$ are removed from the soluble parts either by filter press 12 or by any other suitable method of extraction. The soluble part is evaporated to a solid mass either as crystals or powder in the evaporators 13. It is not necessary to remove all the excess water at this point, as any excess will be driven off in kiln 15. It is then delivered to the feed hopper 14 of the third kiln 15 where it is heated to a temperature above 770° C. for a sufficient time to drive off all the $SO_3$ in the soluble $Al_2(SO_4)_3$. This step changes the $Al_2O_3$ in the soluble $Al_2(SO_4)_3$ to the insoluble $Al_2O_3$.

If no small amounts of $K_2SO_4$ or $Na_2SO_4$ or $Ti_2(SO_4)_3$ are present, the $Al_2O_3$ will be in a commercially pure state. Should any of the above enumerated elements be present, they may be leached out by the addition of water and heated in the vat 16. The insoluble $Al_2O_3$ is removed from the material by a filter press or in any other suitable way and any water present with the $Al_2O_3$ is driven off. If $K_2SO_4$, $Na_2SO_4$ or $Ti_2(SO_4)_3$ are present with the $Al_2(SO_4)_3$, the mass should be heated to a temperature to exceed 1000° C. to vaporize all of the $K_2SO_4$ or $Na_2SO_4$, leaving the pure $Al_2O_3$.

The above method of recovering pure aluminum oxide from calcined clay bodies or the like, or from slags, is more efficient than that disclosed in my earlier issued patent, which is particularly useful for recovering aluminum oxide from alunite ores.

Although one embodiment of the invention has been illustrated and described, it will be evident to those skilled in the art that various modifications may be made in the details thereof, such as the kind of acid used in digestion of the ore compounds, without departing from the principles herein set forth.

I claim:

1. The process of treating alumina bearing ores and the like which comprises the steps of crushing, grinding and screening the ore and passing it to a kiln, calcining the screened ore at temperatures between 300° C. to 900° C., adding sulphuric acid of a concentration of at least 30% to digest the calcined material to change $Al_2O_3$ to soluble $Al_2(SO_4)_3$, and the iron or titanium oxides to soluble sulphates, passing the digested product to a second calcining kiln, treating it at a temperature of from 480° C. to 770° C. to drive off excess $H_2SO_4$ and $SO_3$ to change $Fe_2(SO_4)_3$ to insoluble $Fe_2O_3$, adding water and heating to dissolve all $Al_2(SO_4)_3$, $K_2SO_4$ and $Na_2SO_4$, removing the insoluble residue, evaporating the soluble parts to a solid mass as crystals or powder, passing the soluble parts to a third kiln, heating it to a temperature above 770° C. to drive off all $SO_3$ to change $Al_2(SO_4)_3$ to insoluble $Al_2O_3$, adding water to leach out $K_2SO_4$, $Na_2SO_4$ and $Ti_2(SO_4)_3$ if present, and removing the insoluble $Al_2O_3$.

2. The process of treating alumina bearing ores and the like which comprises the steps of crushing, grinding and screening the ore and passing it to a kiln, calcining the screened ore at temperatures between 300° C. to 900° C., adding sulphuric acid of a concentration of at least 30% to digest the calcined material to change $Al_2O_3$ to soluble $Al_2(SO_4)_3$, and the iron or titanium oxides to soluble sulphates, passing the digested product to a second calcining kiln, treating it at a temperature of from 480° C. to 770° C. to drive off excess $H_2SO_4$ and $SO_3$ to change $Fe_2(SO_4)_3$ to insoluble $Fe_2O_3$, adding water and heating to dissolve all $Al_2(SO_4)_3$, $K_2SO_4$ and $Na_2SO_4$, removing the insoluble residue, evaporating the soluble parts to a solid mass as crystals or powder, passing the soluble parts to a third kiln, heating it to a temperature above 1000° C. to vaporize $K_2SO_4$ and $Na_2SO_4$, leaving pure $Al_2O_3$.

ROBERT C. HAFF.

REFERENCES CITED

The following references are of record in the file of this patent:

UNITED STATES PATENTS

| Number | Name | Date |
|---|---|---|
| 1,233,977 | Cameron | July 17, 1917 |
| 1,388,436 | Moldenke | Aug. 23, 1921 |
| 2,398,425 | Haff | Apr. 16, 1946 |